United States Patent
Nath et al.

(10) Patent No.: US 10,551,836 B2
(45) Date of Patent: Feb. 4, 2020

(54) DRIVER ASSIST

(71) Applicant: Ford Global Technologies, LLC, Dearborn, MI (US)

(72) Inventors: Nitendra Nath, Troy, MI (US); Ryan Danko, Pinckney, MI (US); Aaron L. Mills, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 16/001,109

(22) Filed: Jun. 6, 2018

(65) Prior Publication Data

US 2019/0377339 A1    Dec. 12, 2019

(51) Int. Cl.

| G05D 1/00 | (2006.01) |
|---|---|
| B60W 40/109 | (2012.01) |
| B60W 40/112 | (2012.01) |
| B60W 40/105 | (2012.01) |
| B60W 10/20 | (2006.01) |
| B60W 10/18 | (2012.01) |
| B60W 10/04 | (2006.01) |
| G05D 1/02 | (2006.01) |
| B60W 30/12 | (2006.01) |
| B60W 40/02 | (2006.01) |

(52) U.S. Cl.
CPC .......... *G05D 1/0061* (2013.01); *B60W 10/04* (2013.01); *B60W 10/18* (2013.01); *B60W 10/20* (2013.01); *B60W 30/12* (2013.01); *B60W 40/105* (2013.01); *B60W 40/109* (2013.01); *B60W 40/112* (2013.01); *G05D 1/0219* (2013.01); *B60W 40/02* (2013.01); *B60W 2510/30* (2013.01); *B60W 2520/06* (2013.01); *B60W 2520/10* (2013.01); *B60W 2520/125* (2013.01); *B60W 2520/18* (2013.01); *B60W 2550/12* (2013.01)

(58) Field of Classification Search
CPC .................................................... G05D 1/0061
See application file for complete search history.

(56) References Cited

U.S. PATENT DOCUMENTS

| 5,710,565 | A | 1/1998 | Shirai et al. | |
|---|---|---|---|---|
| 7,451,035 | B2 | 11/2008 | Nozawa et al. | |
| 8,306,712 | B2 | 11/2012 | Deng et al. | |
| 8,849,505 | B2 | 9/2014 | Menard et al. | |
| 9,469,307 | B2 | 10/2016 | Solyom et al. | |
| 10,223,751 | B1* | 3/2019 | Hutchinson | G06Q 40/08 |
| 10,324,463 | B1* | 6/2019 | Konrardy | G01S 19/14 |
| 2014/0379164 | A1* | 12/2014 | Joh | G01C 21/30 701/1 |
| 2018/0174449 | A1* | 6/2018 | Nguyen | G08G 1/083 |
| 2018/0257708 | A1* | 9/2018 | Harada | B62D 15/025 |
| 2019/0049256 | A1* | 2/2019 | Camp | B60W 40/064 |

FOREIGN PATENT DOCUMENTS

EP         3284645 A1     2/2018

* cited by examiner

*Primary Examiner* — Ryan Rink
(74) *Attorney, Agent, or Firm* — Frank A. MacKenzie; Bejin Bieneman PLC

(57) ABSTRACT

A computing system can determine a probability of precipitation based on Bayesian inference conditioned on probabilities associated with vehicle wiper status, vehicle jerk, vehicle sway, and vehicle lateral offset. The computing system can disable a vehicle lane assist system based on the probability of precipitation and operate a vehicle with the disabled vehicle lane assist system.

20 Claims, 10 Drawing Sheets

DRIVER ASSIST

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
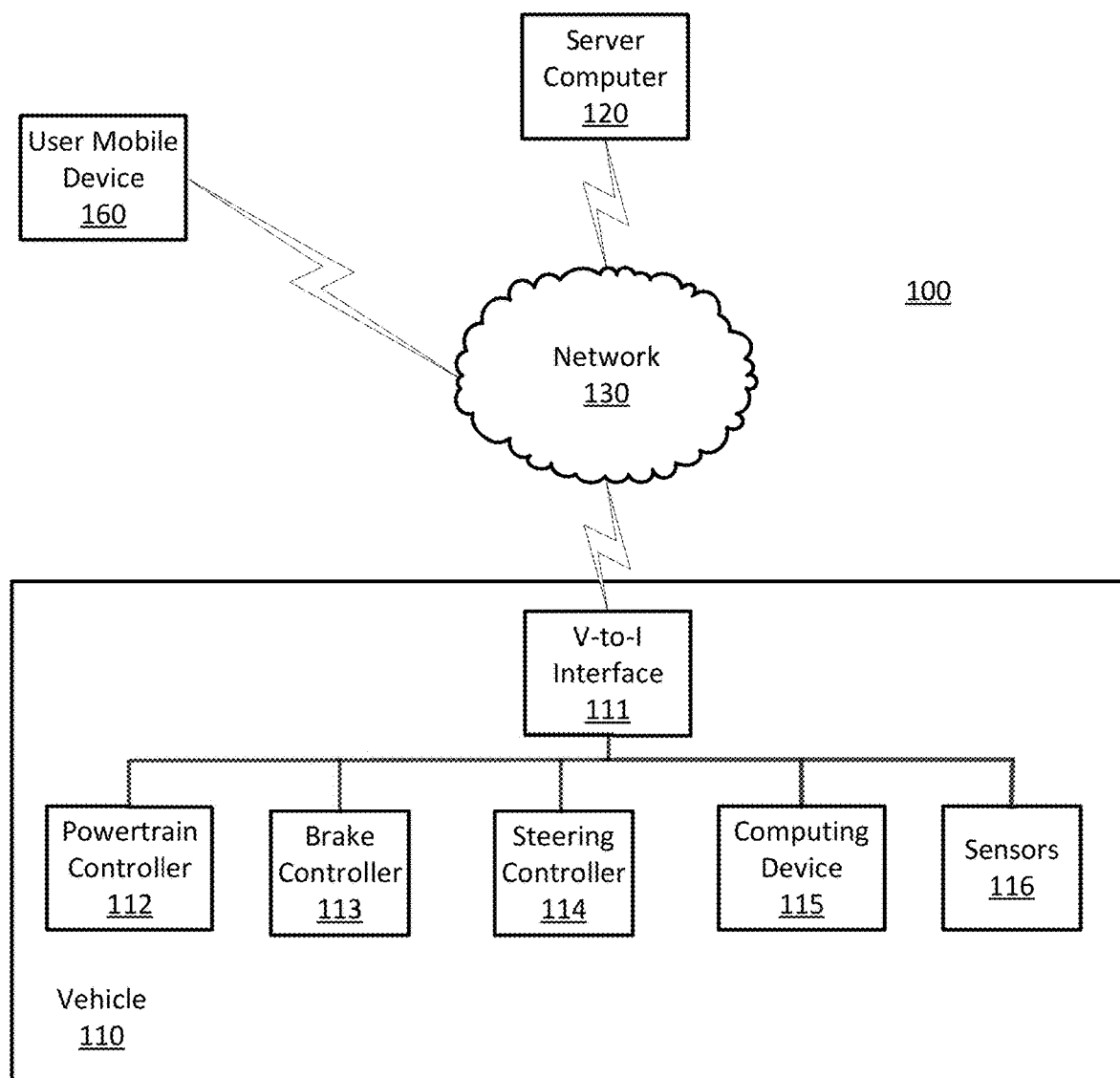
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of vehicle and to use the data to determine trajectories to be used to operate a vehicle in semi-autonomous mode, for example, wherein the computing device can provide a lane centering assist (LCA) system by determining a vehicle path based on sensor data regarding roadway lanes and traffic. A vehicle path can be defined by path polynomial coefficients that determine a polynomial function of vehicle location, speed, direction, lateral acceleration and longitudinal acceleration that describes a predicted path from a current vehicle location to a second point in space. The path polynomial coefficient can be converted by a computing device using control theoretic software programs into control signals to be sent to vehicle powertrain, steering, and braking controllers to cause the vehicle to travel on the path to the second point.

An LCA system can operate a vehicle by maintaining or adjusting a target vehicle speed while staying in a traffic lane, and keeping a minimum distance from other vehicles, without occupant input on vehicle controls. While occupant input on vehicle controls such as accelerator pedal, brake pedal or steering wheel may not be required while the vehicle is being operated by an LCA system, some atmospheric, weather, or environmental conditions can require an occupant to monitor the performance of the LCA system to assure that the LCA system is working properly. For example, the presence of precipitation, including rain, snow, sleet, hail, and fog, etc. in an environment around the vehicle can obscure vehicle sensors, including video sensors, lidar sensors and radar sensors, obscuring data that can be used by an LCA system to determine vehicle trajectories or paths. In the presence of precipitation in the atmosphere, and other atmospheric conditions that reduce visibility for vehicle sensors like precipitation, for example dust storms, smoke or smog, an LCA system can, based on obscure or incomplete sensor data, determine paths for operating the vehicle that can result in the vehicle traveling outside of a desired lane. When this occurs, the occupant can deactivate the LCA system and manually operate the vehicle until the computing device indicates to the occupant that the LCA system has high confidence in the sensor data it is receiving and the LCA system can be re-enabled.

Disclosed herein is a method, including determining a probability of precipitation based on Bayesian inference conditioned on probabilities associated with vehicle wiper status, vehicle jerk, vehicle sway, and vehicle lateral offset and disabling a vehicle lane assist system based on the probability of precipitation. Vehicle wiper status, vehicle jerk, vehicle sway, and vehicle lateral offset can be determined based on vehicle sensor data. vehicle sensor data can include path offset coefficients, path polynomial coefficients, vehicle speed, vehicle lateral acceleration, and path polynomial confidence. Vehicle wiper status can include wiper off, wiper interval, wiper low and wiper high. A probability of precipitation can be empirically determined for each vehicle wiper status including wiper off, wiper interval, wiper low and wiper high. Vehicle lateral jerk can be determined based on a constant velocity model-based Kalman Filter applied to vehicle lateral acceleration. Vehicle sway can be determined based on harmonic analysis of vehicle lateral jerk. Vehicle lateral jerk can be measured in m/s$^2$ and sampled at constant time intervals.

Determining harmonic analysis can include determining three peak-to-peak transitions of vehicle lateral jerk greater than an empirically determined threshold within an empirically determined time period. Vehicle lateral offset can be based on determining a polynomial function based on path polynomial coefficients and vehicle speed. Vehicle lateral offset can compare the polynomial function based on path polynomial coefficients and vehicle speed to a roadway lane to determine whether the vehicle will operate out of the roadway lane. The vehicle lane assist system can be re-enabled based on an empirically determined time period, the probability of precipitation, and the path polynomial confidence. Re-enabling the vehicle lane assist system based on determining a number of times the path polynomial confidence is below an empirically determined threshold in an empirically determined time period. Path polynomial confidence can be based on a goodness of fit value included in lane indicators based on lane markers included in video image data.

Further disclosed is a computer readable medium, storing program instructions for executing some or all of the above method steps. Further disclosed is a computer programmed for executing some or all of the above method steps, including a computer apparatus, programmed to determine a probability of precipitation based on Bayesian inference conditioned on probabilities associated with vehicle wiper status, vehicle jerk, vehicle sway, and vehicle lateral offset and disabling a vehicle lane assist system based on the probability of precipitation. Vehicle wiper status, vehicle jerk, vehicle sway, and vehicle lateral offset can be determined based on vehicle sensor data. vehicle sensor data can include path offset coefficients, path polynomial coefficients, vehicle speed, vehicle lateral acceleration, and path polynomial confidence. Vehicle wiper status can include wiper off, wiper interval, wiper low and wiper high. A probability of precipitation can be empirically determined for each vehicle wiper status including wiper off, wiper interval, wiper low and wiper high. Vehicle lateral jerk can be determined based on a constant velocity model-based Kalman Filter applied to vehicle lateral acceleration. Vehicle sway can be determined based on harmonic analysis of vehicle lateral jerk. Vehicle lateral jerk can be measured in $m/s^2$ and sampled at constant time intervals.

The computer apparatus can be further programmed to determine harmonic analysis including determining three peak-to-peak transitions of vehicle lateral jerk greater than an empirically determined threshold within an empirically determined time period. Vehicle lateral offset can be based on determining a polynomial function based on path polynomial coefficients and vehicle speed. Vehicle lateral offset can compare the polynomial function based on path polynomial coefficients and vehicle speed to a roadway lane to determine whether the vehicle will operate out of the roadway lane. The vehicle lane assist system can be re-enabled based on an empirically determined time period, the probability of precipitation, and the path polynomial confidence. Re-enabling the vehicle lane assist system based on determining a number of times the path polynomial confidence is below an empirically determined threshold in an empirically determined time period. Path polynomial confidence can be based on a goodness of fit value included in lane indicators based on lane markers included in video image data.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing device, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115, and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 can sense the environment in which the vehicle 110 is operating, e.g., sensors 116 can detect phenomena such as weather or atmospheric conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
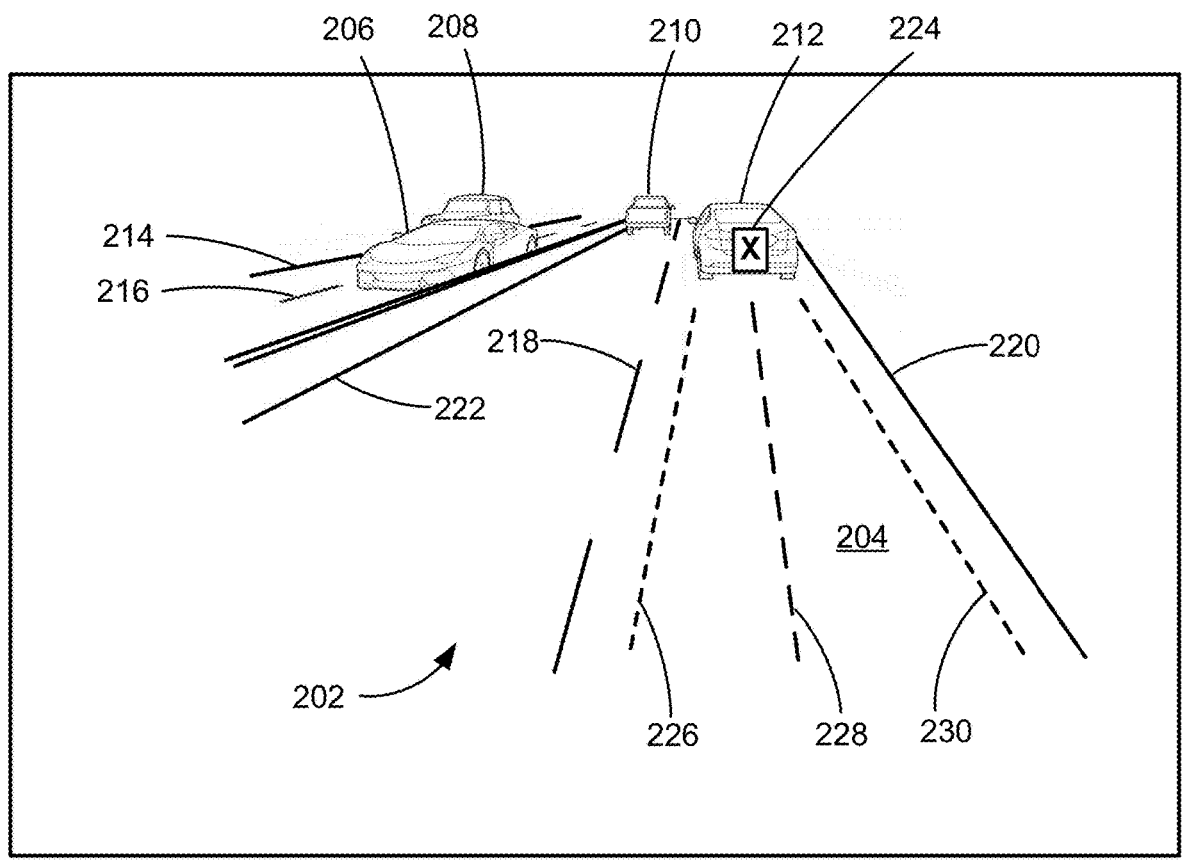
FIG. 2 is a diagram of an example image of a traffic scene.

FIG. 2 is a diagram of an example image 200 of a traffic scene. Image 200 is a black and white rendering of a color video image, so rendered to comply with 37 C.F.R. 1.84(a)(1). Image 200 can be color video data acquired by a computing device 115 from a color video sensor 116 included in vehicle 110. In this example, a color video sensor 116 can be configured to provide an image 200 of a traffic scene acquired by a sensor 116 of a vehicle 110 on roadway 202, thereby providing image 200 data to an LCA system included in computing device 115 as described above to operate vehicle 110 in lane 204 of roadway 202. LCA system including in computing device 115 can process image 200 to determine objects and boundaries including other vehicles 206, 208, 210, 212 lane markers 214, 216, 218, 220 and lane barrier 222 and thereby operate vehicle 110 within a lane 204.

Computing device 115 can process image 200 data to determine that other vehicle 212 is traveling ahead and in the same lane 204 as vehicle 110 and mark other vehicle 212 in image 200 with an in-lane leading vehicle marker 224. Computing device can process image 200 data including lane markers 218, 220 to determine lane indicators 226, 230 based on machine vision techniques including RGB thresholding with respect to empirically determined threshold values and Hough transforms, for example. Lane indicators 226, 230 can be combined with in-lane leading vehicle maker 224 to determine path polynomial 228 based on control theoretic calculations including Kalman filtering and PID control, for example. Path polynomial 228 includes path polynomial coefficients that can be input to control processes executing on computing device 115 to determine control signals to control powertrain, steering, and braking via controllers 112, 113, 114 to operate vehicle along a path that matches the path polynomial 228 and thereby operate vehicle 110 within lane 204.

Figure 3:
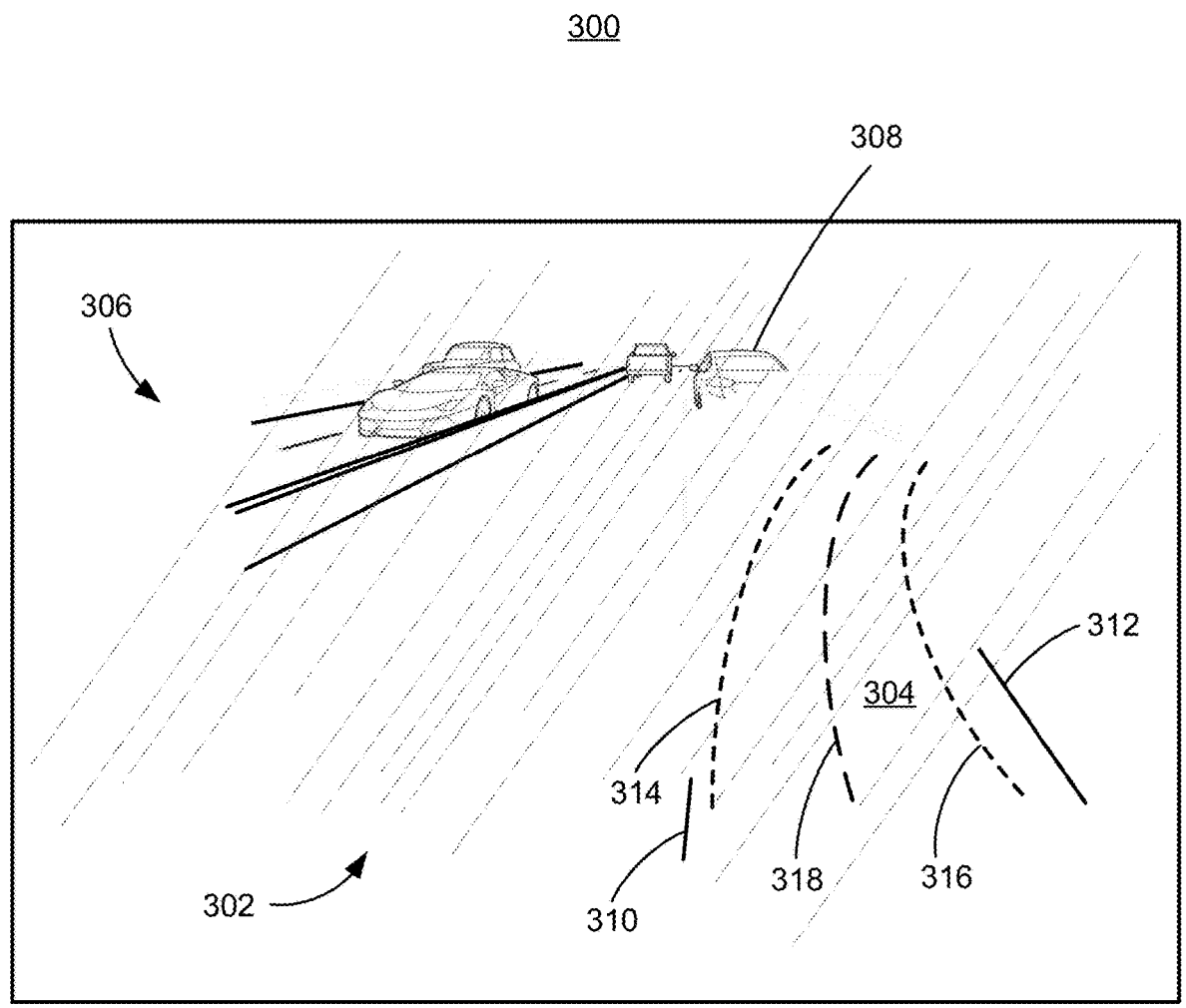
FIG. 3 is a diagram of an example image of a traffic scene.

FIG. 3. is a diagram of an example black and white rendering of a color video image 300 of a traffic scene. Image 300 can be acquired by computing device 115 via a color video sensor 116 included in vehicle 110 to be input to an LCA system included in computing device 115 as in FIG. 2, above. As in FIG. 2, image 300 can be used by computing device 115 to operate vehicle 110 on roadway 302 in lane 304; however, the presence of precipitation 306 (diagonal dashed lines), can partially or completely obscures some objects and boundaries in image 300 including a leading vehicle 306, and lane markers 310, 312. In the absence of reliable object and boundary data regarding a leading vehicle 306, and lane markers 310, 312, computing device 115 can determine lane indicators 314, 316 that depart from lane 304. Path polynomial 318 determined based on unreliable object and boundary data can cause computing device 115 to operate vehicle 110 in an unwanted lateral direction with respect to a lane 304, for example. When this happens, techniques disclosed herein can provide output to computing device 115 to command computing device 115 to disable and re-enable an LCA system.

Disabling an LCA system while vehicle 110 is operating with an LCA system engaged can include commanding LCA system to stop sending commands to controllers 112, 113, 114 to operate vehicle 110. When this happens, computing device 115 can instruct vehicle 110 to slow to a stop or begin using information from another data sources to determine path polynomials for operating vehicle 110. Other data sources include computing device 115 reverting to previously acquired lane indicator and in-lane vehicle marker information and determine a path polynomial for operating vehicle 110 based on the extrapolating the previously acquired information. Computing device 115 can also determine a path polynomial for operation vehicle 110 based on vehicle location information determined by sensors 116 including GPS and accelerometers, and map information stored at computing device 115 or downloaded from the Internet via V-to-I interface 111. Computing device 115 can also sound an audio alert and/or flash a visual alert via a human machine interface that includes, e.g., a display screen, a speaker, etc. controlled by the computer 115, to avoid requiring an occupant to intervene without warning before computing device 115 disables an LCA system. Re-enabling an LCA system can include computing device 115 determining path polynomials based on high confidence lane indicators and operating vehicle 110 to travel on a roadway within lanes in traffic including other vehicles. When computing device 115 re-enables an LCA system, computing device can also alert an occupant via a human machine interface.

For example, computing device 115 can determine a probability of precipitation and, based on the determined probability of precipitation, data from sensors 116 regarding vehicle 110 operation, and data from the LCA system, computing device 115 can provide an output command to computing device 115 to disable the LCA system and alert an occupant before vehicle 110 travels out of lane 304. Computing device 115 can predict when the LCA system can be re-enabled based on determining a current probability of precipitation and a current confidence in sensor 116 data. This will be discussed in relation to FIGS. 4-8, below. Providing output and disabling the LCA system in this fashion avoids either of (a) the occupant to notice the undesirable travel direction, manually disable the LCA system and assume control of vehicle 110, possibly without warning, or (b) requiring computing device 115 to determine that the vehicle 110 is about to travel outside of a previously determined lane 304 and provide output to alert an occupant and disable the LCA system, again possibly without warning. Techniques discussed herein determine that an LCA system is operating a vehicle 110 in a fashion that can result in the vehicle 110 traveling out of a lane. By determining when an LCA system has a probability of causing a vehicle 110 to travel out of lane that is higher than an empirically determined threshold, based on a probability of precipitation and information from vehicle sensors 116 and feedback from the LCA system, techniques discussed herein can provide output to alert an occupant and command computing device to disable the LCA system before vehicle 110 begins traveling out of lane.

Figure 4:
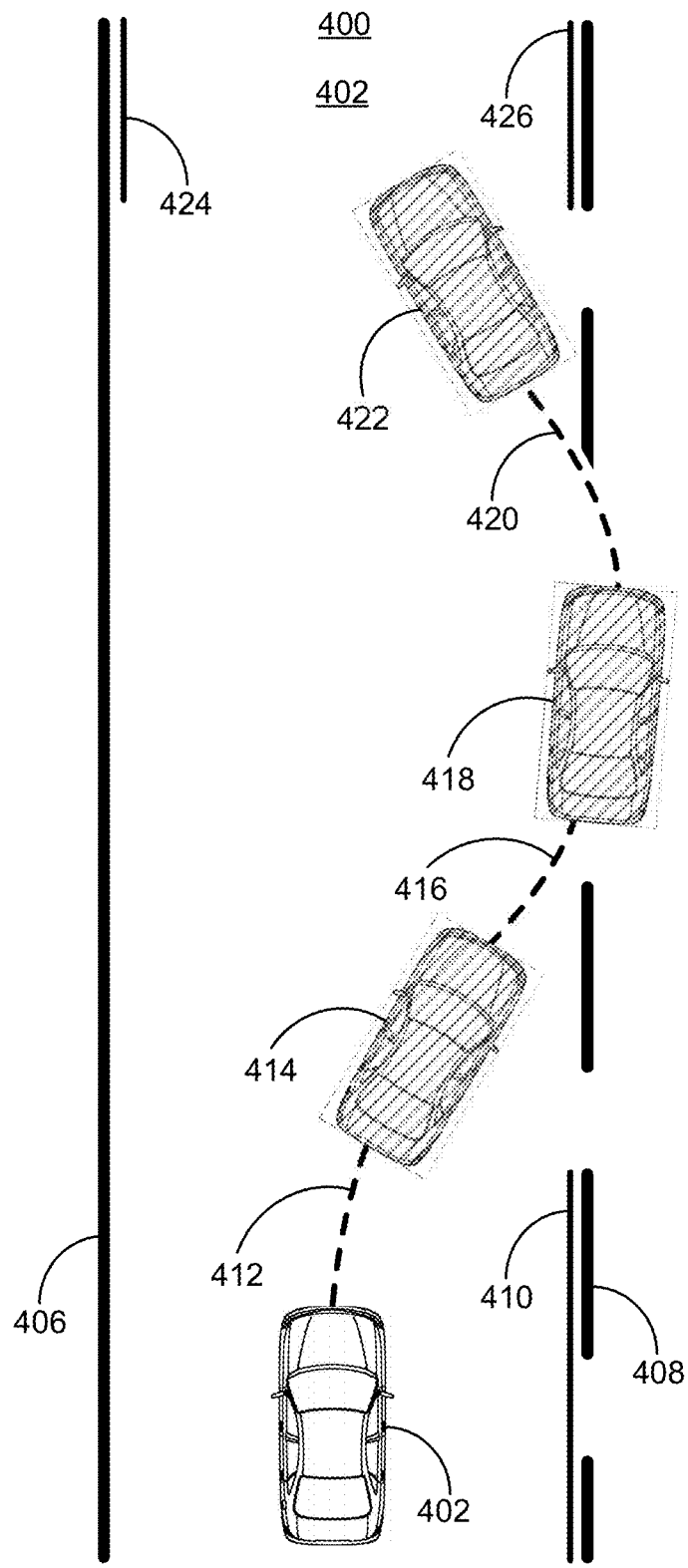
FIG. 4 is a diagram of an example vehicle and vehicle path on a roadway.

FIG. 4 is a top-down diagram of an example roadway 400. Roadway 400 has a lane 402 and lane markers 406, 408. A vehicle 110 is traveling on roadway 400 at position 404 in lane 402 at time t0, for example. Roadway 400 includes lane markers 406, 408; however, because of precipitation at time t0, lane markers 406, 408 are obscured in video sensor 116 data and computing device 115 can only detect a single lane indicator 410 as a result of obscured video sensor 116 data regarding lane markers 406, 408. Even with incomplete data regarding lane markers 406, 408, computing device 115 can determine path polynomial 412 and, based on the included polynomial coefficients, operate vehicle 110 to position 414 at time t1. At time t1, based on lane indicator 410, computing device can operate vehicle 110 along path polynomial 416. Operating vehicle 110 along path polynomial 416 will operate vehicle 110 out of lane 402. At time t1 computing device 115 can determine that the rate of lateral travel is greater than an empirically determined maximum can determine that vehicle 110 is about to travel out of lane, alert the occupant and disable the LCA system. The occupant can also determine at time t1 that vehicle 110 will soon travel out of lane 402, disable the LCA system and assume manual operation of vehicle 110. By time t2, an occupant has assumed manual operation, vehicle 110 is at position 418, and is being operated manually to return to lane 404 along path 420. At time t3 vehicle 110 is at position 422 and has returned to lane 402 under manual control. At time t3 computing device 115 has determined lane indicators 424, 426 associated with lane markers 406, 408 respectively, with high confidence.

High confidence in the present context means that the machine vision program executing on computing device 115 that determine lane indicators 424, 426 includes a parameter that measures the performance of the machine vision process statistically to determine a high or low confidence value for the output based on empirically determined performance parameters. For example, least squares fitting can be used to determine lane indicators from lane marker data. Least squares fitting techniques return a parameter r that is an error term generated by the difference between the input data and output fit. A high value of r (0.70-0.99) represents a good fit and therefore high confidence. A low value of r (0.40-0.69) represents a moderate fit and therefore low confidence. Values of r below 0.40 indicate no confidence in the fit. Because computing device 115 has determined that lane indicator 424, 426 data is high confidence, the LCA system can be re-enabled at time t3.

Figure 5:
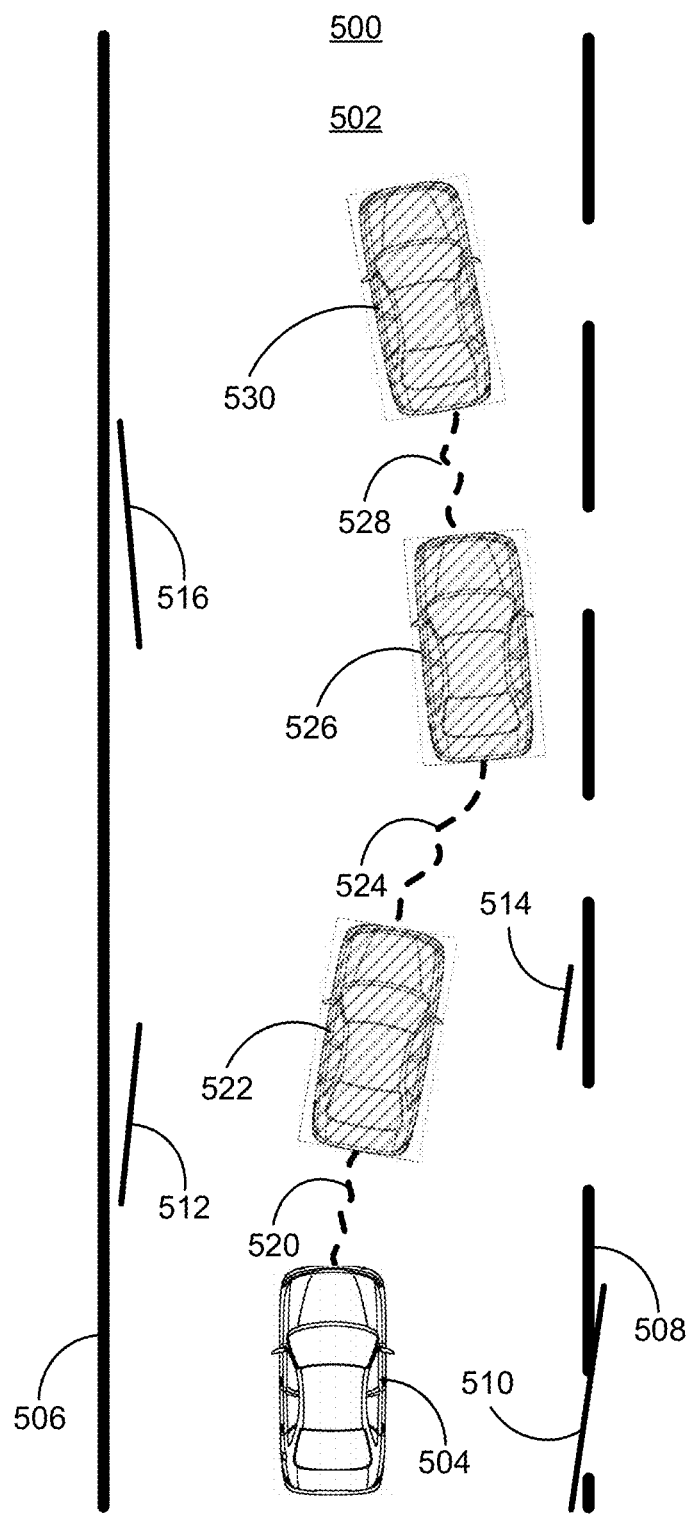
FIG. 5 is a diagram of an example vehicle and vehicle path on a roadway.

FIG. 5 is a top-down diagram of an example roadway 500. Roadway 500 has a lane 502 and lane markers 506, 508. A vehicle 110 is traveling on roadway 500 at position 504 in lane 402 at time t0, for example. Roadway 500 includes lane markers 506, 808; however, because of precipitation at time t0, lane markers 506, 508 are obscured in video sensor 116 data and computing device 115 can only detect lane indicators 510, 512, 514, 516, with low confidence. Based on incomplete, low confidence lane indicator 510, 512, 514, 516 data, computing device 115 determines paths 520, 524, 528 to operate vehicle 110 to positions 522, 526, 530 at times t1, t2, and t3, respectively. While vehicle 110 remains in lane 502 from time t1 through time t3, paths 524, 528, 532 are unstable and oscillating. In this example an LCA system can cause vehicle 110 to jerk or sway within lane 502 without deactivating, and undesirable result. Techniques discussed herein can determine when paths 524 528, 532 are unstable and oscillating and alert an occupant and deactivate the LCA system.

Figure 6:
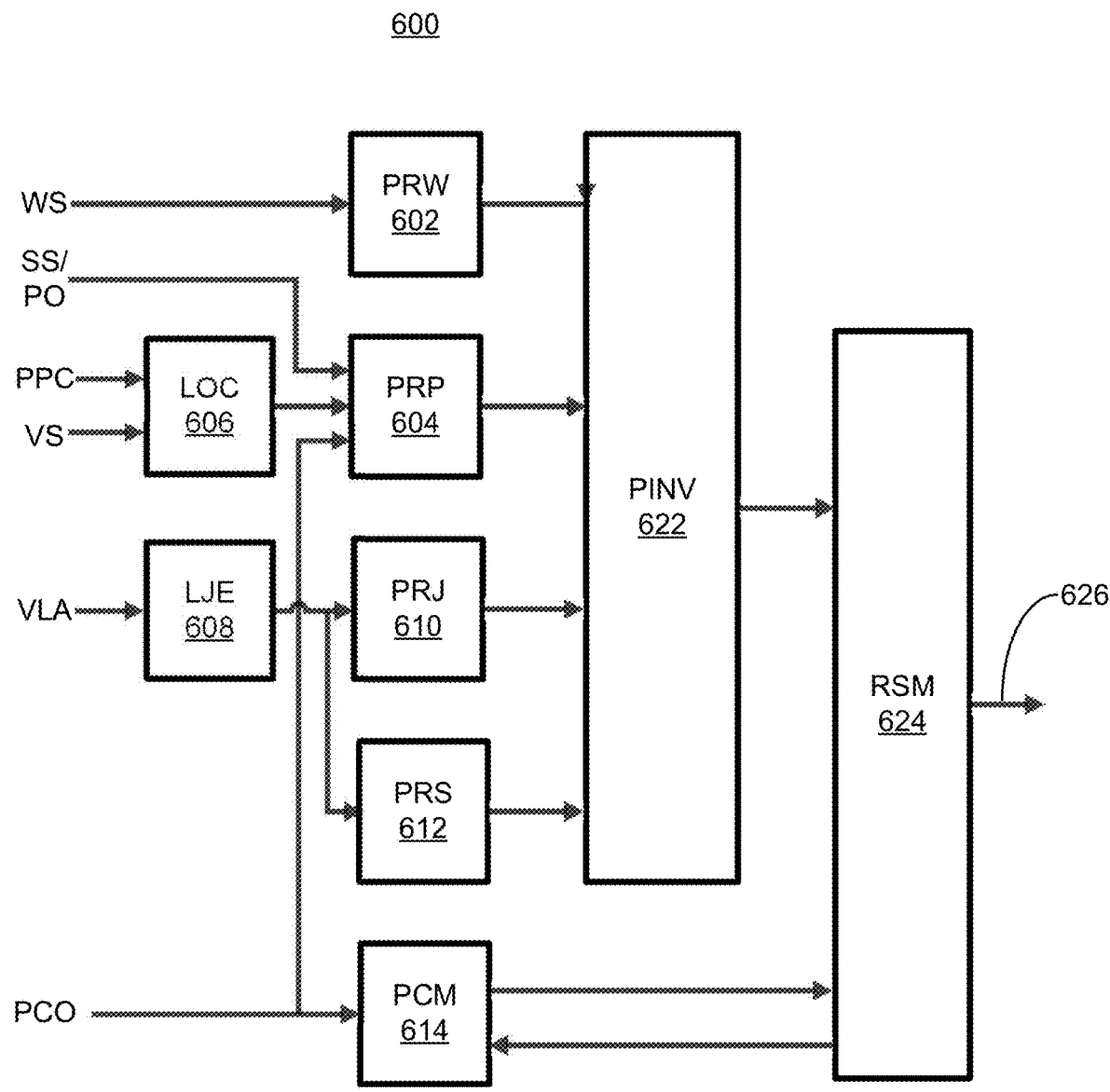
FIG. 6 is a diagram of an example process to determine a probability of precipitation.

FIG. 6 is a diagram of an example process 600 to disable and re-enable a vehicle LCA system based determining a probability of precipitation based on Bayes Theorem for conditional probability. Process 600 can be a software process executing on computing device 115 to receive data from sensors 116 and other software processes executing on computing device 115, and to produce output data to be input to other software processes on computing device 115 to operate vehicle 110. Process 600 combines inertial signals from vehicle 110 sensors 116 including accelerometers with predicted path information and windshield wiper status information to predict the probability of precipitation having an adverse effect on LCA system performance. Techniques discussed herein combine inertial signals with predicted path information and wiper status because wiper status alone does not predict precipitation with enough accuracy to be used alone. For example, wipers can be set to AUTO, where sensors 116 associated with the wipers can detect precipitation on a windshield of a vehicle 110 and activate the wipers depending upon the amount of precipitation detected on a windshield, or wipers can be set to INTERVAL, wherein the wipers pause between wipes to handle light rain or drizzle. In these examples the wiper status is in an "ON" state, but the amount of precipitation not enough to obscure roadway lane markers or leading vehicles, and therefore cause an LCA system to create undesirable paths. In these examples, computing device 115 should not disable the LCA system, since the LCA system can produce acceptable paths for the vehicle 110 to operate along. Techniques discussed herein can determine a probability of precipitation ("Rain") conditioned on wiper status, vehicle jerk, vehicle sway and vehicle path to determine when to alert an occupant and disable the LCA system.

Process 600 is a process to determine a probability that precipitation is present that can cause an invalid situation for an LCA system, wherein the LCA system will create one or more paths for a vehicle 110 that will result in the vehicle 110 following an undesirable path, where an undesirable path can direct the vehicle 110 out of the lane the vehicle is operating within. Process 600 determines four Bayesian probabilities for precipitation, referred to as "Rain" for brevity herein, where the Bayesian probability P(Rain|Wipers) determines the probability of precipitation affecting LCA system performance conditioned on Wipers, which is the status of vehicle 110 windshield wipers, namely {OFF, ON-INTERVAL, ON-LOW, ON-HIGH}. P(Rain|Jerk) determines the probability of precipitation affecting LCA system performance conditioned on the probability that vehicle 110 experienced a jerk, which is defined as the first derivative of vehicle 110 acceleration and refers to quick, lateral motion of a vehicle 110. The Bayesian probability P(Rain|Sway) determines the probability of precipitation affecting LCA system performance conditioned on the probability that vehicle 110 experienced vehicle sway, which can be defined as periodic lateral motion of a vehicle 110 that remains within a lane. The Bayesian probability P(Rain|Path) determines the probability of precipitation affecting LCA system performance conditioned on the probability that the LCA system has produced an unstable path that can cause the vehicle 110 to operate out of a lane.

The total probability of precipitation that can affect LCA system performance P(Rain), can be determined by combining equations for P(Rain|Wipers), P(Rain|Jerk), P(Rain|Sway), and P(Rain|Path) according to the equation:

$$P(\text{Rain}) = P(\text{Rain}|\text{Wipers}) * [P(\text{Rain}|\text{Jerk}) + P(\text{Rain}|\text{Sway}) + P(\text{Rain}|\text{Path})] \quad (1)$$

Rationale for combining these Bayesian probabilities include the assumption that Bayesian probabilities P(Rain|Jerk), P(Rain|Sway), and P(Rain|Path) are mutually exclusive, meaning that the probabilities that these events can occur simultaneously is zero. Equation (5) also assumes that P(Rain|Wipers) is statistically independent to the Bayesian probabilities P(Rain|Jerk), P(Rain|Sway) and P(Rain|Path), meaning that the probability of precipitation conditioned on the wiper status does not change regardless of the probabilities of precipitation conditioned on vehicle jerk, vehicle sway and vehicle path.

The mutually exclusive probabilities associated with P(Rain|Jerk), P(Rain|Sway), and P(Rain|Path) can be determined by expressing them according to Bayes Theorem:

$$P(\text{Rain}|\text{Jerk}) = \frac{P(\text{Jerk}|\text{Rain})}{P(\text{Jerk})} \quad (2)$$

$$P(\text{Rain}|\text{Sway}) = \frac{P(\text{Sway}|\text{Rain})}{P(\text{Sway})} \quad (3)$$

$$P(\text{Rain}|\text{Path}) = \frac{P(\text{Path}|\text{Rain})}{P(\text{Path})} \quad (4)$$

where P(Jerk|Rain), P(Sway|Rain), and P(Path|Rain) are calculated as discussed below and P(Jerk), P(Jerk), P(Sway), and P(Path) can be determined empirically and represent tunable design parameters that can be determined empirically.

Returning to FIG. 6, process 600 receives as input wiper status (WS), system status and path offset coefficients (SS/PO), path polynomial coefficients (PPC), vehicle speed (VS), vehicle lateral acceleration (VLA), and path polynomial confidence (PCON). Wiper status includes four vehicle windshield wipers operating modes including "OFF", "INTERVAL", "LOW", and "HIGH", where each mode can describe a setting of a manual control associated with the wipers, for example. Wiper status is input to block PRW 602, for wiper status monitoring and computation of P(Rain|Wipers), annotated as "PRW." An empirically determined delay, for example, two seconds, can be applied to wiper status when wiper status changes from a higher state to a lower state, wherein wiper status is ranked from lowest ("OFF") to highest ("HIGH"). Probability of precipitation conditioned on wiper status is shown in Table 1. The probability of precipitation conditioned on wiper status can be determined empirically and is a tunable design parameter.

TABLE 1

| Wiper Status | P(Rain | Wipers) |
| --- | --- |
| OFF | 0.00 |
| INTERVAL | 0.70 |
| LOW | 0.90 |
| HIGH | 1.00 |

Path polynomial coefficients (PPC) and vehicle speed (VS) are input to 606 to compute path lateral offset (LOC). Computing device 115 can determine the rate of lateral offset based on path polynomial and vehicle speed according to a polynomial equation.

$$y(x) = a_0 + a_1 x + a_2 x^2 + a_3 x^3 \quad (5)$$

where $a_0$ is an offset (constant), $a_1$ is the vehicle heading (direction), $a_2$ is the path curvature and $a_3$ is the curvature rate and x is the lookahead distance calculated at 1 second in the future. The 1 second lookahead time is a tunable parameter. The amount of lateral offset at fixed future time intervals ("lookahead offset") is input to 604 (PRP). Vehicle lateral acceleration (VLA) can measured by accelerometers, for example, that output vehicle acceleration in three dimensions (3D) to computing device 115.

Vehicle lateral acceleration can be input to 608 to estimate vehicle lateral jerk (LJE). Vehicle lateral jerk is the first derivative of vehicle lateral acceleration and is calculated with a constant velocity model-based Kalman filter. A constant velocity model-based Kalman filter combines a moving sequence of vehicle lateral acceleration samples acquired at fixed time intervals to determine a current estimate of lateral jerk. Estimation of lateral jerk based on vehicle lateral acceleration is discussed in relation to FIG. 7, below.

Block 604 combines input from system status & path offset coefficients (SS/PO) with lookahead offset LOC from block 606 and path polynomial confidence (PCON) to calculate the Bayesian probability P(Path|Rain) as discussed above. System status determines whether a lane change maneuver is currently being performed by computing device 115. At times when computing device 115 is directing controllers 112, 113, 114 to control vehicle powertrain, steering and braking so as to cause vehicle 110 to change lanes, calculation of P(Path|Rain) can be suppressed, because, based on block 606 output, path polynomial offset and path polynomial coefficients, during a lane change maneuver, 604 will determine correctly that vehicle 110 is about to travel outside of a current lane. Based on path polynomial offset PO, which includes the coefficients of a polynomial equation that describes the difference between a current vehicle 110 path and a previously predicted path that describes vehicle 110 travel within a lane based on high confidence lane indicators and path polynomial coefficients PPC that describe the current vehicle 110 path, block 604 counts the number of discontinuities, or jumps in the input value of path polynomial offset PO, per unit time greater that an empirically determined threshold that are associated with path polynomial confidence PCO changing from a HIGH state to a LOW state. When the number of jumps in path polynomial output are greater than a predetermined threshold, for example six jumps per second, block 604 would output a high probability of a bad path that would direct vehicle 110 out of the current lane.

Block 610 inputs an estimate of vehicle lateral jerk from block 608 and calculates the Bayesian probability P(Jerk|Rain) (PRJ) as discussed above. P(Jerk|Rain) can be determined by sampling input vehicle lateral jerk input at predetermined time intervals, for example 10 Hz or 100 milliseconds per sample. If an absolute value of vehicle lateral jerk input is greater than or equal to an empirically determined threshold, for example 1.5 m/s$^2$, a Bayesian probability P(Jerk|Rain) can be incremented by a first value, for example 0.1, stopping at a maximum of 1.0. If the absolute value of lateral jerk is less than the empirically determined value, the counter can be decremented by a second value, for example 0.1, stopping at a minimum value of zero. The first and second values can be empirically determined.

Figure 7:
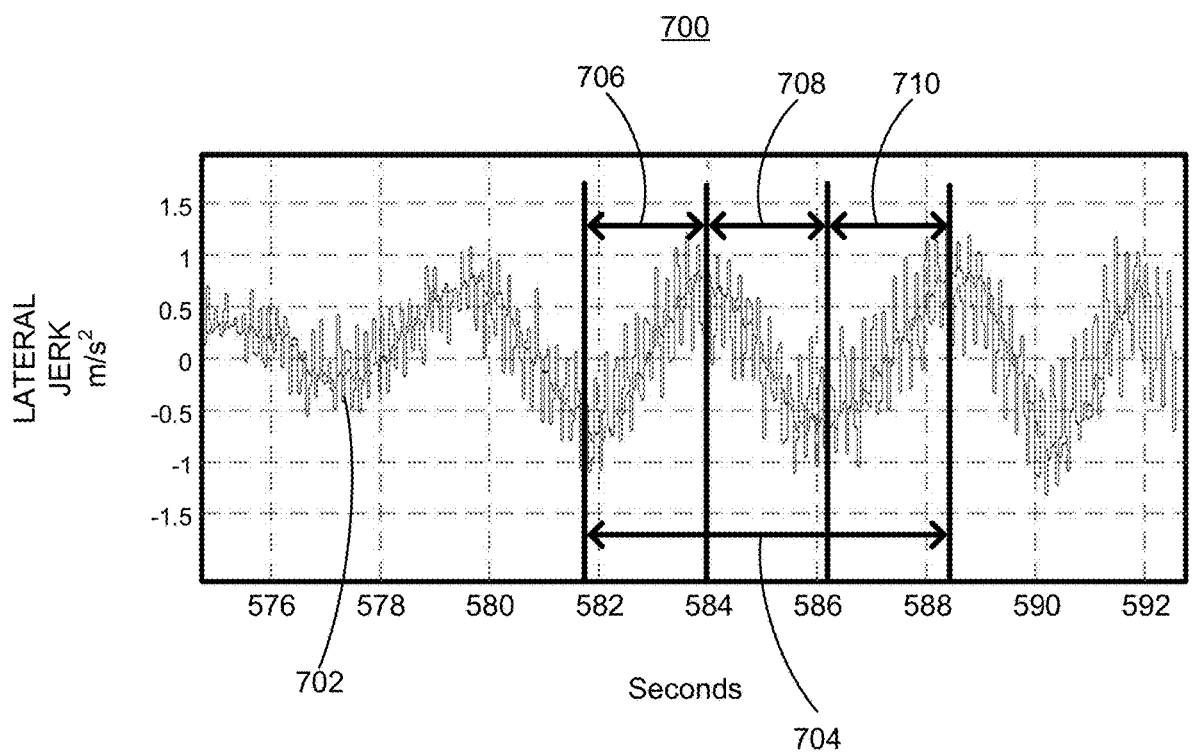
FIG. 7 is a diagram of an example graph of vehicle lateral acceleration.

Block 612 inputs estimates of vehicle lateral jerk (LJE) from block 608 and calculates a Bayesian probability P(Sway|Rain) based on harmonic analysis of vehicle lateral jerk as described in relation to FIG. 7. FIG. 7 is an example graph of vehicle lateral jerk 700. Graph of vehicle jerk 700 plots vehicle lateral jerk 702 in m/s$^2$ output from LJE 608 on the y-axis and time in seconds on the x-axis. Analysis of vehicle lateral jerk 702 over the time period represented reveals no values of lateral jerk greater than +/−1.5 m/s$^2$, so, for example, block 610 will not increment P(Jerk|Rain). Also, vehicle lateral acceleration represented by vehicle lateral jerk 702 is not sustained in a direction that would indicate that vehicle 110 was traveling out of a lane and therefore P(Path|Rain) would equal zero.

Block 612 can determine P(Sway|Rain) (PRS) based on vehicle lateral jerk 702 exceeding an empirically determined threshold, for example, +/−0.8 m/s$^2$, peak-to-peak 706, 708, 710 in both directions within an empirically determined time period, for example, about +/−three seconds. If the peak-to-peak 706, 708, 710 vehicle lateral jerk exceeds the threshold three or more time within an empirically determined time duration 704 (7 seconds), P(Sway|Rain) is incremented by an empirically determined value, for example 0.25, otherwise P (Sway|Rain) can be decremented by an empirically determined constant designed to return P(Sway|Rain) to zero in four seconds.

Figure 8:
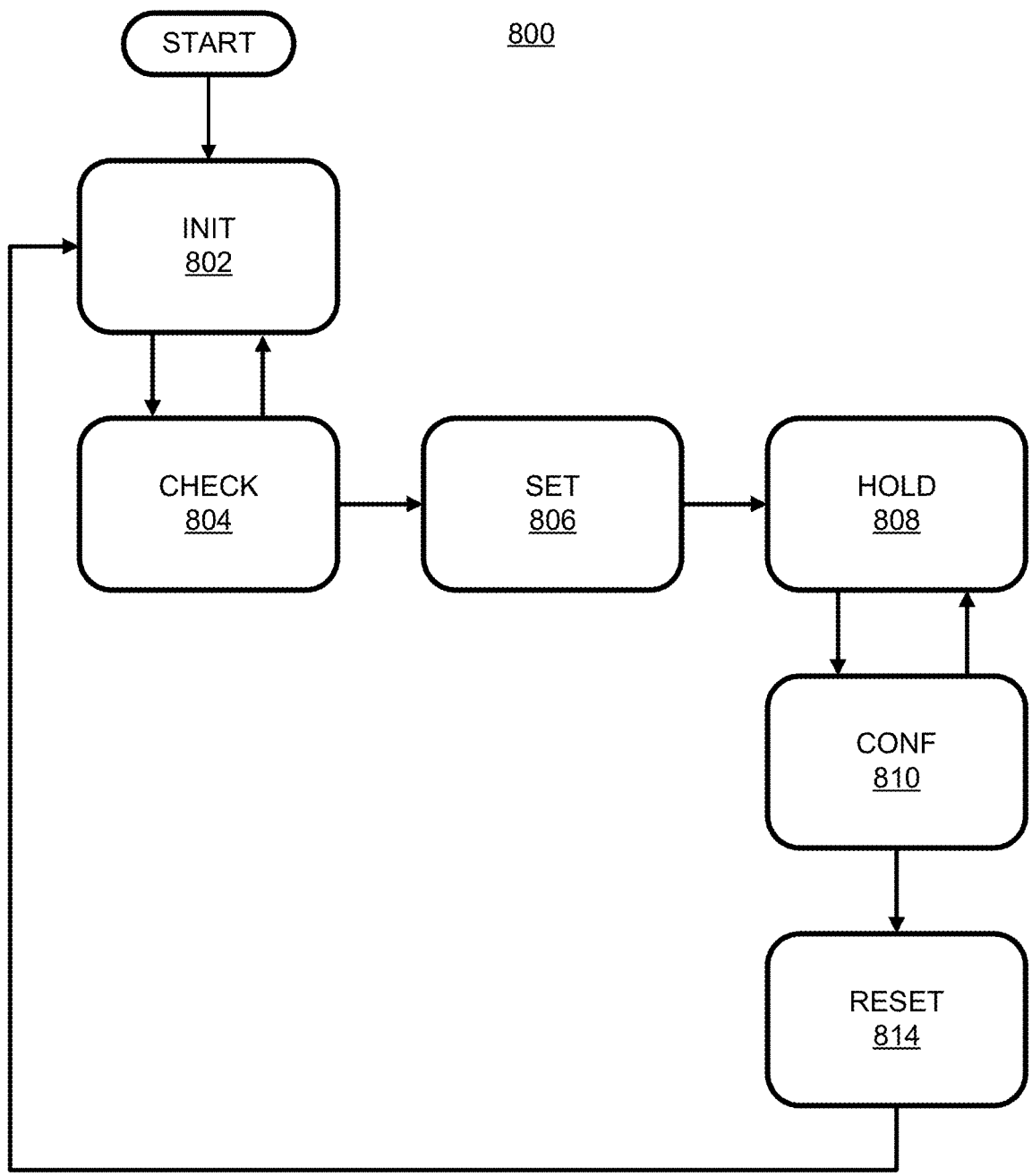
FIG. 8 is an example state diagram of vehicle lane assist disabling and re-enabling.

Returning to FIG. 6, block 622 receives as input P(Rain|Wipers), P(Rain|Jerk), and P(Rain|Path), and calculates P(Rain) (PINV) according to equation (1), above. Block 622 outputs P(Rain) to block 602, (Rain Situation Manager or RSM), which receives as input P(Rain) from block 622 and, based on a state diagram 800 such as shown in FIG. 8, determines output 626 which includes commands to computing device 115 to disable a lane assist system based on the probability of precipitation P (Rain). RSM 624 can transmit a confidence check request to block 614, which receives and monitors path polynomial confidence data PCO. Upon request from block 624, the block 614 updates the block 624 with new path polynomial confidence data. The new path polynomial confidence data is used by state diagram 800 to determine when to re-enable a disabled lane assist system. Block 624 (RSM) can re-enable a lane assist system based on an empirically determined time period, a probability of precipitation P(Rain), and path polynomial confidence input from block 614 by outputting a command to re-enable a lane assist system to computing device 115 via output 626.

FIG. 8 is an example state diagram 800 of vehicle lane assist disabling and re-enabling. State diagram 800 describes processing and changes in state performed by block 624 of process 600 in FIG. 6 in response to inputs from blocks 622 and 614. State diagram 800 starts at INIT state 802, where INIT state 802 sets internal variables InvalidWeather=FALSE and Count=0. Upon receiving a probability of precipitation P (Rain) from block 622 of process 600 greater than an empirically determined first threshold, state diagram 800 transitions to CHECK state 804. CHECK State 804 increments Count and, if Count is less than an empirically determined second threshold, for example 3, CHECK state 804 returns to INIT state 802. When Count increments past the second threshold CHECK 804 sets InvalidWeather=TRUE, outputs a command to disable a lane assist system to computing device 115 via output 626 and transitions to HOLD state 808. HOLD state 808 resets Count=0 and transitions to CONF state 810 each time output from block 622 indicates a probability of precipitation P (Rain) lower than an empirically determined third threshold. CONF state 810 increments Count each time PCM 614 returns a "high" path polynomial confidence value in response to a request. If Count is less than an empirically determined fourth threshold, for example 10, CONF state 810 transitions back to HOLD state 808. When the Count exceeds the fourth threshold, CONF state 810 transitions to RESET state 810, where RESET state 810 sets InvalidWeather=FALSE, outputs a command to re-enable a lane assist system to computing device 115 via output 626, and then transitions to INIT state 802 to begin again.

Figure 9:
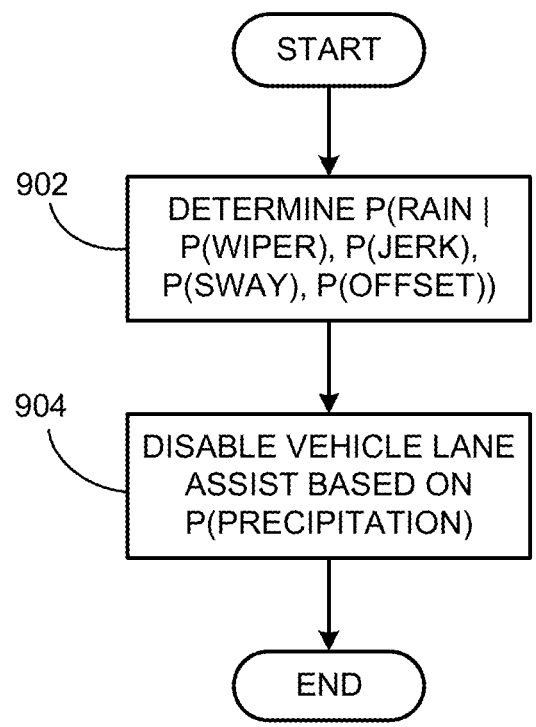
FIG. 9 is a flowchart diagram of an example process to disable vehicle lane assist based on a probability of precipitation.

FIG. 9 is a diagram of a flowchart, described in relation to FIGS. 1-8, of a process 900 for operating a vehicle based on disabling a vehicle lane assist system. Process 900 can be implemented by a processor of computing device 115, taking as input information from sensors 116, and executing commands and sending control signals via controllers 112, 113, 114, for example. Process 900 includes multiple steps taken in the disclosed order. Process 900 also includes implementations including fewer steps or can include the steps taken in different orders.

Process 900 begins at step 902, where a computing device 115 included in a vehicle 110 determines a probability of precipitation (rain) based on Bayesian probabilities wherein a probability of precipitation is conditioned on determined Bayesian probabilities of vehicle wiper status, vehicle jerk, vehicle sway and vehicle path offset conditioned on probabilities of precipitation and empirically determined probabilities of vehicle wiper status, vehicle jerk, vehicle sway and vehicle path offset as discussed above in relation to FIGS. 6 and 7.

At step 904, computing device 115 can disable a vehicle lane assist system based on the probability of precipitation determined at step 902. FIG. 8 is a state diagram 800 that describes how RSM 624 of process 600 in FIG. 6 determines when to output a command to computing device 115 to disable a vehicle lane assist system. State diagram 800 also describes how RSM 624 of process 600 can determine when to output a command to computing device 115 to re-enable a vehicle lane assist system. Following step 904 process 900 ends.

Figure 10:
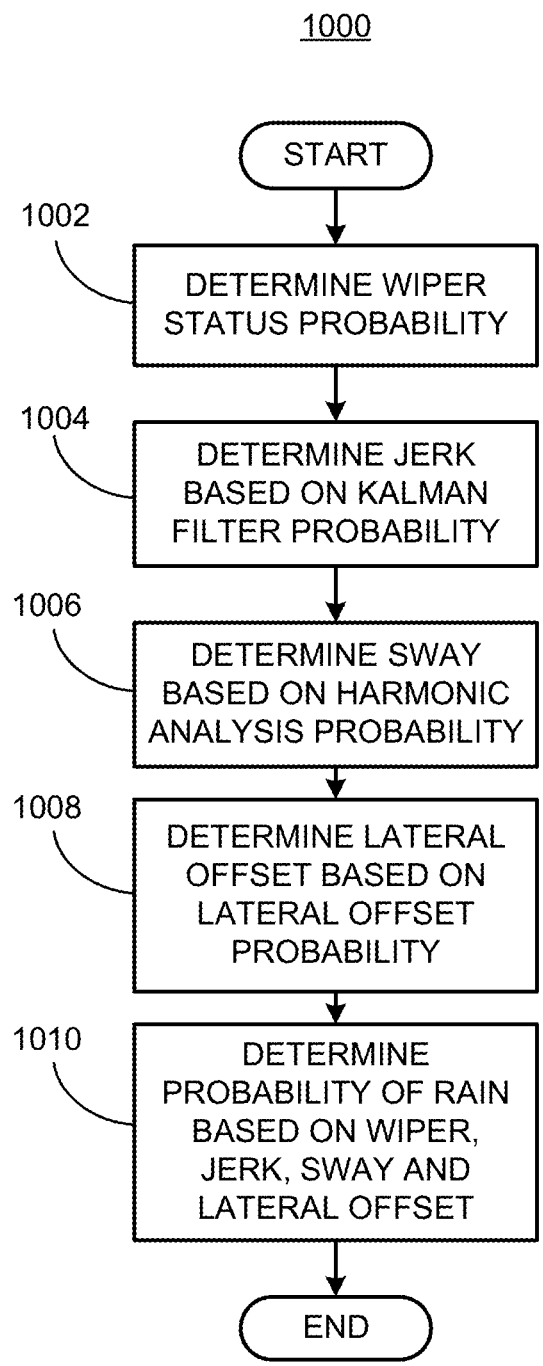
FIG. 10 is a flowchart diagram of an example process to determine a probability of precipitation based on vehicle sensor data.

FIG. 10 is a diagram of a flowchart, described in relation to FIGS. 1-8, of a process 1000 for determining a Bayesian probability of precipitation (rain) based on vehicle wiper status, vehicle jerk, vehicle sway and vehicle lateral offset. Process 1000 can be implemented by a processor of computing device 115, taking as input information from sensors 116, and executing commands and sending control signals via controllers 112, 113, 114, for example. Process 1000 includes multiple steps taken in the disclosed order. Process 1000 also includes implementations including fewer steps or can include the steps taken in different orders.

Process 1000 begins at step 1002, where a computing device 115 included in a vehicle 110 determines a Bayesian probability P(Rain|Wipers), which is the probability of precipitation conditioned on a probabilities of wiper status as discussed in relation to FIG. 6. Probabilities of wiper status are based on determining a setting of a physical wiper switch and can be empirically determined based on the switch setting.

At step 1004 computing device 115 can determine a Bayesian probability P(Rain|Jerk), which is the probability of precipitation conditioned on a probability that a vehicle 110 is experiencing vehicle jerk as described in relation to FIG. 6. If computing device detects vehicle jerk by determining vehicle lateral acceleration greater than an empirically determined threshold, computing device can increment the probability P(Rain|Jerk).

At step 1106 computing device 115 can determine a Bayesian probability P(Rain|Sway), which is the probability of precipitation conditioned on a probability that vehicle 110 is experiencing vehicle sway. As discussed in relation to FIGS. 6 and 7, vehicle sway is periodic motion determined by harmonic analysis of vehicle lateral jerk in m/s$^2$ to determine if vehicle 110 is experiencing three peak-to-peak lateral jerk events within a predetermined time period. Each time a vehicle experiences three peak-to-peak lateral jerk events within a predetermined time period, computing device 115 can increment P(Rain|Sway).

At step 1108 computing device 115 can determine a Bayesian probability P(Rain|Path), which is the probability of precipitation conditioned on a probability that vehicle lateral offset indicates that vehicle 110 is about to travel out of a lane as discussed in relation to FIG. 6. Computing device can analyze a predicted path polynomial that describes the motion of vehicle 110 and determine that following the predicted path polynomial will cause vehicle 110 to travel out of a lane. When vehicle 110 is operating with a lane assist system enabled, traveling out of a lane is not acceptable behavior. In examples where precipitation has caused lane markers to be missing or recognized with low confidence, a lane assist system can cause a vehicle 110 to travel out of previously determined lanes. Techniques described herein detect this condition and increment the value of P(Rain|Path).

At step 1010, the Bayesian probabilities determined in steps 1002, 1004, 1006 and 1008 are combined according to equation (1) above to determine an overall probability of precipitation P(Rain). Based on the overall probability of precipitation and path polynomial confidence as discussed in relation to FIGS. 6 and 8, computing device can disable and re-enable a lane assist system. Following step 1010 process 1000 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a probability of precipitation based on Bayesian inference conditioned on probabilities associated with vehicle wiper status, vehicle jerk, vehicle sway, and vehicle lateral offset; and
   disabling a vehicle lane assist system based on the probability of precipitation.

2. The method of claim 1, further comprising determining vehicle wiper status, vehicle jerk, vehicle sway, and vehicle lateral offset based on vehicle sensor data.

3. The method of claim 2, wherein vehicle sensor data includes path offset coefficients, path polynomial coefficients, vehicle speed, vehicle lateral acceleration, and path polynomial confidence.

4. The method of claim 3, wherein vehicle wiper status includes wiper off, wiper interval, wiper low and wiper high.

5. The method of claim 3, wherein vehicle lateral jerk is determined based on a constant velocity model-based Kalman Filter applied to vehicle lateral acceleration.

6. The method of claim 3, wherein vehicle sway is determined based on harmonic analysis of vehicle lateral jerk.

7. The method of claim 3, wherein vehicle lateral offset is based on determining a polynomial function based on path polynomial coefficients and vehicle speed.

8. The method of claim 3, further comprising re-enabling the vehicle lane assist system based on an empirically determined time period, the probability of precipitation, and the path polynomial confidence.

9. The method of claim 8, further comprising determining path polynomial confidence by determining a number of times the path polynomial is below an empirically determined threshold in an empirically determined time period.

10. A system, comprising a processor; and
    a memory, the memory including instructions to be executed by the processor to:
    determine a probability of precipitation based on Bayesian inference conditioned on probabilities associated with vehicle wiper status, vehicle jerk, vehicle sway, and vehicle lateral offset; and
    disabling a vehicle lane assist system based on the probability of precipitation.

11. The system of claim 10, further comprising determining vehicle wiper status, vehicle jerk, vehicle sway, and vehicle lateral offset based on vehicle sensor data.

12. The system of claim 11, wherein vehicle sensor data includes path offset coefficients, path polynomial coefficients, vehicle speed, vehicle lateral acceleration, and path polynomial confidence.

13. The system of claim 12, wherein vehicle wiper status includes wiper off, wiper interval, wiper low and wiper high.

14. The system of claim 12, wherein vehicle lateral jerk is determined based on a constant velocity model-based Kalman Filter applied to vehicle lateral acceleration.

15. The system of claim 12, wherein vehicle sway is determined based on harmonic analysis of vehicle lateral jerk.

16. The system of claim 12, wherein vehicle bad lateral offset is based on determining a polynomial function based on path polynomial coefficients and vehicle speed.

17. The system of claim 12, further comprising re-enabling the vehicle lane assist system based on an empirically determined time period, the probability of precipitation, and the path polynomial confidence.

18. The system of claim 17, further comprising determining path polynomial confidence by determining a number of times the path polynomial is below an empirically determined threshold in an empirically determined time period.

19. A system, comprising:
    means for controlling vehicle steering, braking and powertrain;
    computer means for:
    determining a probability of precipitation based on Bayesian inference conditioned on probabilities associated with vehicle wiper status, vehicle jerk, vehicle sway, and vehicle lateral offset; and
    disabling a vehicle lane assist system based on the probability of precipitation; and
    operating a vehicle with the disabled vehicle lane assist system based on the means for controlling vehicle steering, braking and powertrain.

20. The system of claim 19, further comprising determining vehicle wiper status, vehicle jerk, vehicle sway, and vehicle lateral offset based on vehicle sensor data.

* * * * *